(No Model.)  L. A. MILLER.  5 Sheets—Sheet 1.
SEWING MACHINE.

No. 572,557.  Patented Dec. 8, 1896.

Witnesses
Geo. W. Young.
N. E. Oliphant.

Inventor
Lee A. Miller
By H. G. Underwood
Attorneys (No Model.)
5 Sheets—Sheet 2.

L. A. MILLER.
SEWING MACHINE.

No. 572,557. Patented Dec. 8, 1896.

Witnesses
Geo. W. Lowry,
N. E. Oliphant

Inventor
Lee A. Miller
By H. G. Underwood
Attorney (No Model.) 5 Sheets—Sheet 3.
L. A. MILLER.
SEWING MACHINE.
No. 572,557. Patented Dec. 8, 1896.
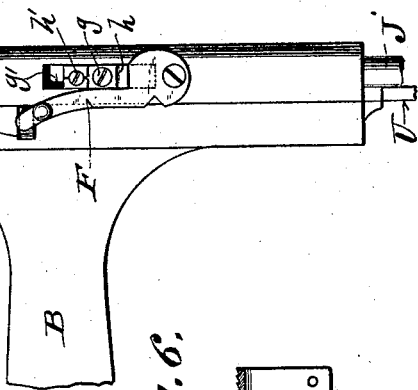
Fig. 4.
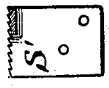
Fig. 6.
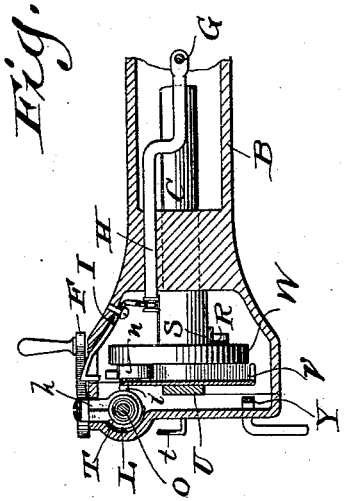
Fig. 5.
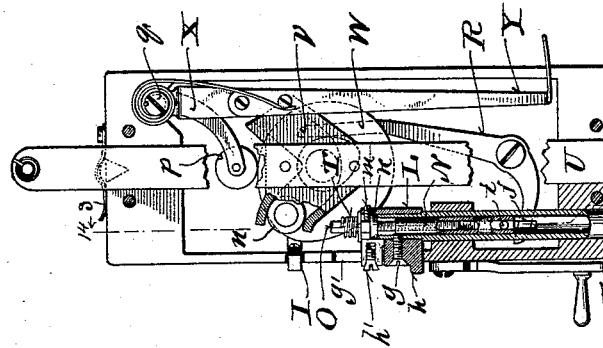
Fig. 3.
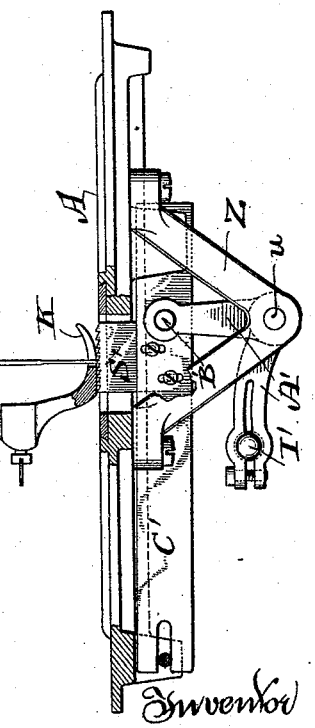
Witnesses
Geo. W. Young.
N. E. Oliphant
Inventor
Lee A. Miller,
By H. G. Underwood
Attorney (No Model.) 5 Sheets—Sheet 4.
L. A. MILLER.
SEWING MACHINE.
No. 572,557. Patented Dec. 8, 1896.
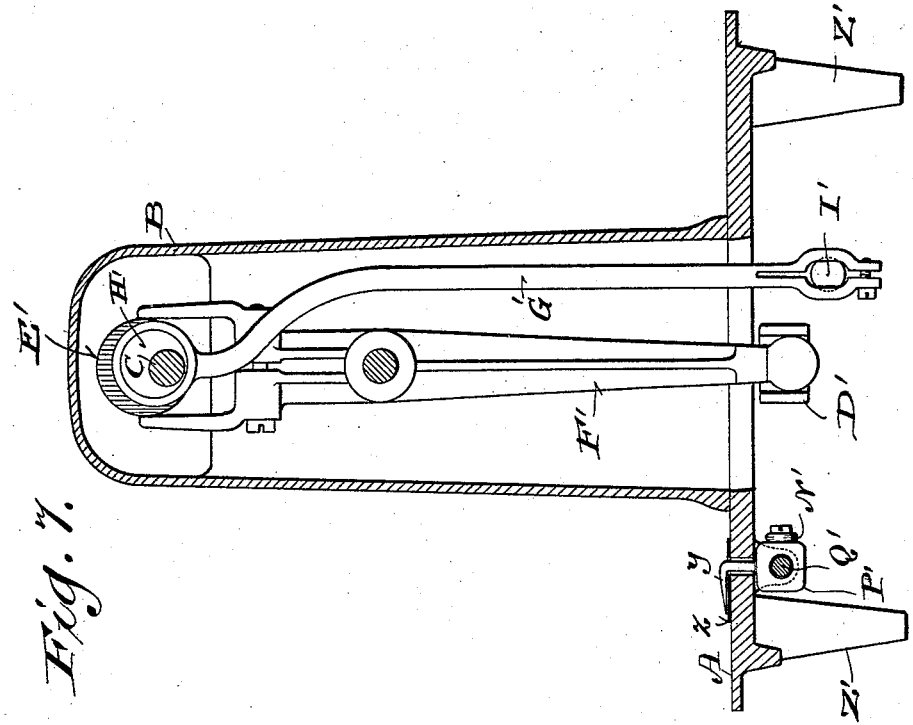
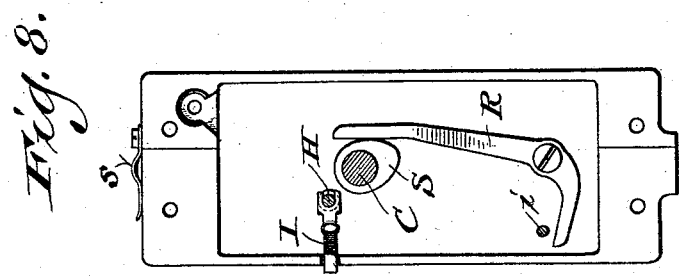
Witnesses
Geo. W. Young,
N. E. Oliphant
Inventor
Lee A. Miller
By H. G. Underwood
Attorney (No Model.) 5 Sheets—Sheet 5.
L. A. MILLER.
SEWING MACHINE.
No. 572,557. Patented Dec. 8, 1896.
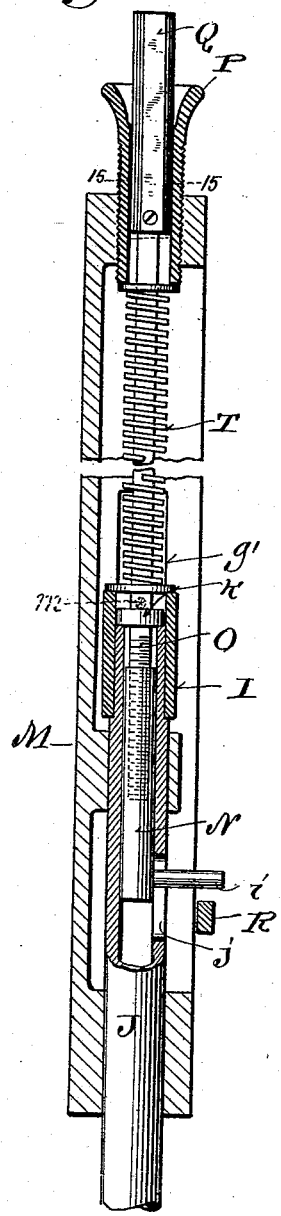
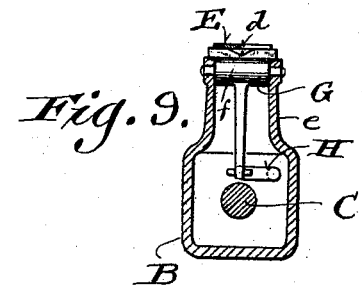
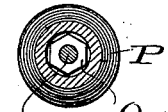
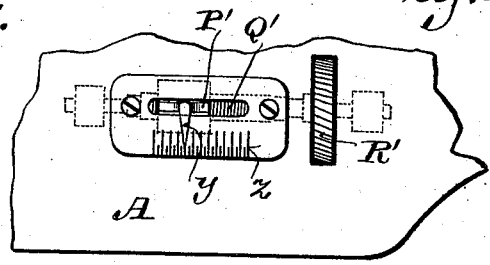
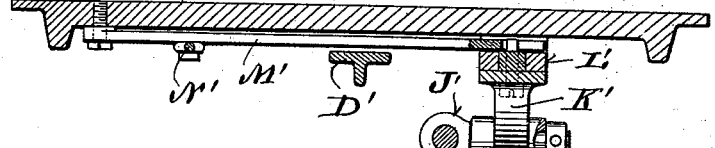
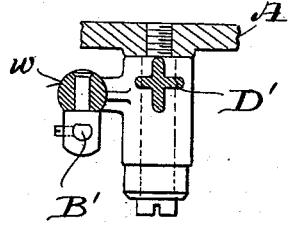
Witnesses
Geo. W. Young.
N. E. Oliphant.
Inventor
Lee A. Miller
By H. G. Underwood
Attorney

UNITED STATES PATENT OFFICE.

LEE A. MILLER, OF MILWAUKEE, WISCONSIN, ASSIGNOR OF ONE-HALF TO SAMUEL B. FULLER, OF WATERTOWN, WISCONSIN.

SEWING-MACHINE.

SPECIFICATION forming part of Letters Patent No. 572,557, dated December 8, 1896.

Application filed May 2, 1894. Serial No. 509,804. (No model.)

*To all whom it may concern:*

Be it known that I, LEE A. MILLER, a citizen of the United States, and a resident of Milwaukee, in the county of Milwaukee, and in the State of Wisconsin, have invented certain new and useful Improvements in Sewing-Machines; and I do hereby declare that the following is a full, clear, and exact description thereof.

My invention has for its object to provide a sewing-machine having various advantages over those in common use; and it consists in certain peculiarities of construction and combination of parts hereinafter set forth with reference to the accompanying drawings, and subsequently claimed.

Figure 1:
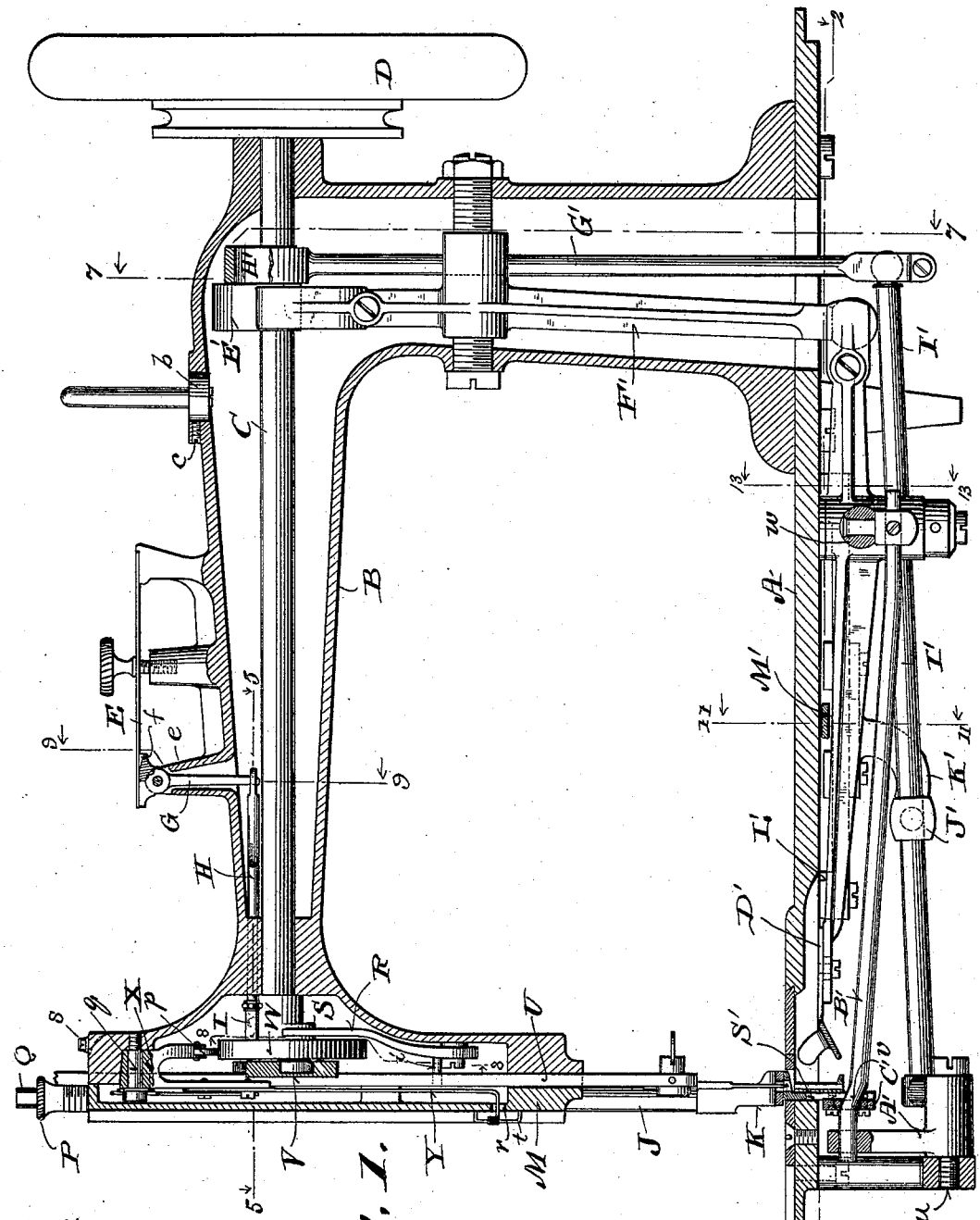
Figure 2:
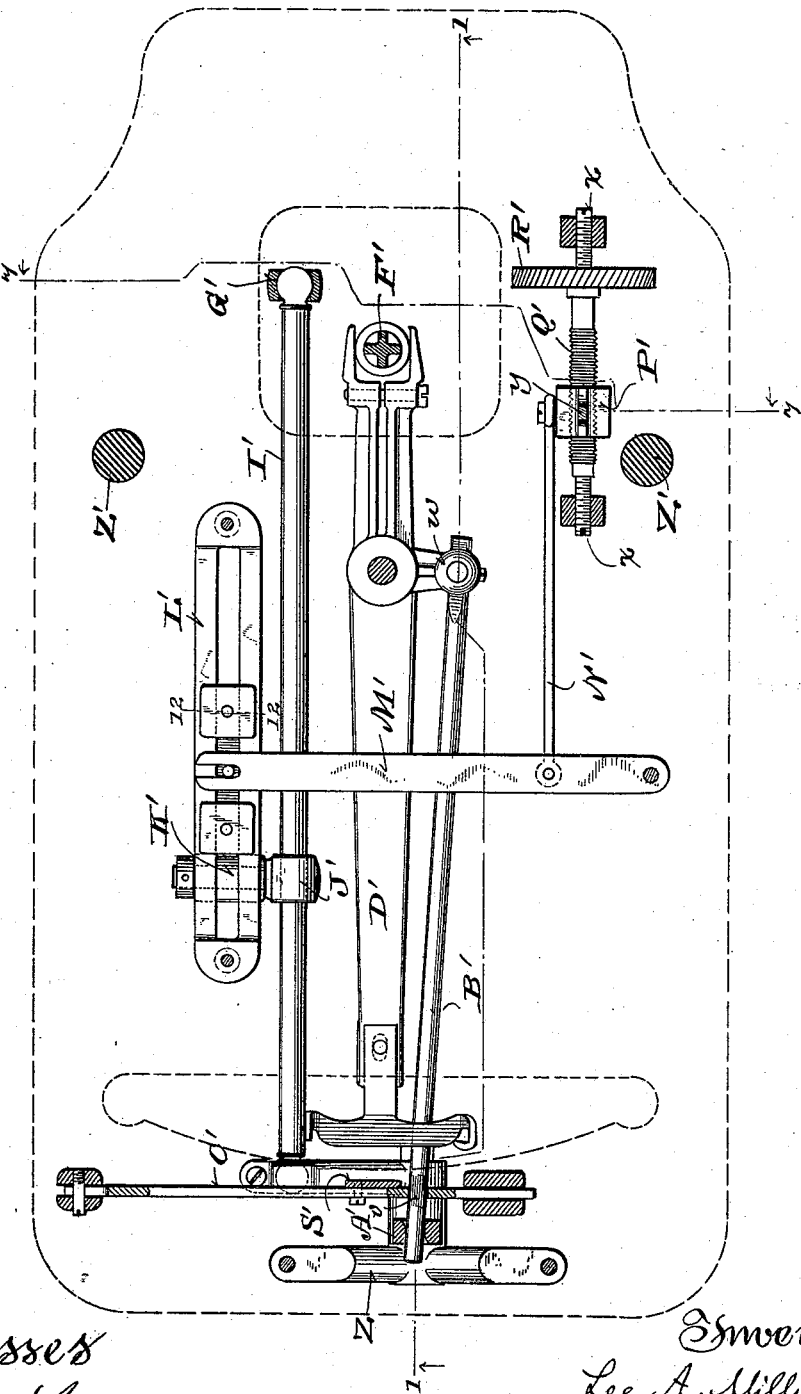

In the drawings, Figure 1 represents a vertical longitudinal section on line 1 1 of Fig. 2, and illustrates a sewing-machine head embodying my improvements; Fig. 2, a plan view, partly in section, on line 2 2 of Fig. 1, illustrating the mechanism beneath the bed-plate of the machine-head; Fig. 3, an elevation of the needle end of the machine-head, the face-plate being detached and certain of the parts broken away; Fig. 4, a detail elevation illustrating the presser-foot lifter at its greatest elevation and in working contact with lever that constitutes a part of my improved mechanism for liberating the spool-thread tension; Fig. 5, a horizontal section taken on line 5 5 of Fig. 1; Fig. 6, a detail view of the feed-dog; Fig. 7, a detail section taken on lines 7 7 of Figs. 1 and 2; Figs. 8 and 9, similar views respectively taken on lines 8 8 and 9 9 of Fig. 1; Fig. 10, a detail plan view illustrating a portion of a mechanism employed to indicate the length of stitch; Fig. 11, a detail section taken on line 11 11 of Fig. 1, a tilting rod that constitutes part of the machine being omitted; Fig. 12, a similar view taken on line 12 12 of Fig. 2; Fig. 13, a like view taken on line 13 13 of Fig. 1, a connecting-lever forming part of the machine being omitted; Fig. 14, another detail section taken on line 14 14 of Fig. 3, and Fig. 15 a horizontal section taken on line 15 15 of Fig. 14.

Referring by letter to the drawings, A represents the bed-plate, and B the arm of my sewing-machine head. The arm is provided with the usual bearings for the shaft C, that carries the belt-pulley balance-wheel D common in that class of machines to which my invention relates. The upper rear portion of the arm B is provided with a suitable opening that corresponds in contour with a spool-pin base *b*, held in said opening by a set-screw *c*, the latter having its bearings in said arm.

In common with various sewing-machines now in use I provide the arm B with a spring tension-plate E, having a lateral guide-slot *d* for the spool-thread, but one of the features of the present invention involves the liberation of the tension by means of a mechanism actuated by the presser-foot lifter F, and that form of the mechanism herein shown will be now described.

The free end of the tension-plate rests on the flat head of a rocker G, trunnioned in a tubular vertical branch *e* of the machine-arm, and said rocker-head is provided at its inner end with a graduated central recess *f* in line with the draft of the spool-thread. The shank of the rocker is joined to one end of a link-rod H, that has free play within a solid portion of the machine-arm longitudinally of the same, and the other end of the rod is joined to an angular lever I, fulcrumed in said machine-arm and having its free end extended outward through a slot in the same to come in the path of the presser-foot lifter when the latter is swung in the direction necessary to the greatest elevation of said foot.

The construction and arrangement of parts involved in the rocker-actuating mechanism are best illustrated in Fig. 5, and when pressure of the lifter F is exerted on the lever I the resultant movement of the rod H will tilt the rocker against the plate E, thereby releasing the tension from the spool-thread, the central recess at the inner end of the rocker-head being for the purpose of obtaining necessary clearance for said thread.

From the foregoing it will be seen that the action of the tension-liberator is not only automatic but positive, and incidental to its operation work may be readily removed from the machine or the bobbin wound without taking the thread from the needle.

The present machine has a tubular shank J for its presser-foot K, this shank being loose in suitable guides that are cast on the face-plate of said machine. Fitted on the shouldered upper end of the presser-foot shank is a sleeve L, held in place by a screw $g$, engaging a block extension $h$ of said sleeve, and this extension loosely engages a guide-slot $g'$ in that edge of the face-plate M to which the presser-foot lifter is pivotally connected.

In order to compensate for wear, a portion of the block extension on the sleeve L is kerfed at right angles to form jaws that may be expanded by the beveled head of a screw $h'$, engaged therewith.

Loose in the tubular shank J is a tapped sleeve N, provided with a right-angled lug $i$, that extends through a longitudinal slot $j$ in said shank. Engaging the tapped sleeve is the screw-threaded end of a stem O, having a collar $k$, held against vertical movement on the upper end of the shank J by a stop-screw $m$, extending in from the head-sleeve on said shank, as is clearly illustrated in Fig. 3. The stem runs up into a screw-sleeve P, engaged with a tapped opening in the upper end of the face-plate M, and a suitable head Q, made fast to the upper end of said stem, facilitates the rotation of the same to effect a vertical adjustment of the sleeve N, to thereby raise or lower the lug $i$ thereon, whereby this lug may be brought in or out of the path of an arm of a bell-crank lever R, fulcrumed in the machine-arm parallel to said face-plate. A cam S on the shaft C operates against the other arm of the bell-crank lever R, and the limit of lift or vibration of the presser-foot depends entirely on the adjustment that brings the lug $i$ of sleeve N more or less in the range of throw on the part of the opposing arm of said lever. For plain stitching the sleeve N is adjusted to bring its lug $i$ out of the path of the lever R, but for embroidery, buttonholing, and various other sewing the presser-foot is vibrated to permit of the work being turned, the needle acting as a pivot. It is also to be noted that the range of vertical play on the part of the presser-foot when adjusted for plain stitching will permit a yield to cross-seams of great thickness, this being one of the advantages of my machine.

In order to obtain the necessary tension on the presser-foot, I employ a spiral spring T, that surrounds the stem O intermediate of washers thereon, impinging the opposing ends of the sleeves L P, the latter sleeve being adjusted to vary the tension.

The needle-bar U of my machine is provided with the usual grooved cross-head V, engaged by a roller $n$ on a cam W, fast to the shaft C, and the periphery of this cam is in contact with another roller $p$ in one downwardly-extended arm of a two-arm rocker X, that has the head portion thereof loose on a screw-pin $q$, extending laterally from the upper solid portion of the head-arm into the recess in rear of the face-plate M, whereby the pin and rocker are concealed and out of the way. It is also to be observed that I avoid the necessity for having an opening in the head-arm over the cam W, and thereby protect the latter and adjacent parts from dust. Secured to another downwardly-extended arm of the rocker X by screws or other suitable means is the shank portion of a hook-like take-up Y, the hook portion of this take-up being at a right angle to the shank and extended outward through a horizontal slot $r$ in the lower part of the face-plate M of the machine. Hence it will be seen that the hook is the only exposed portion of the take-up mechanism. As clearly shown in Figs. 1 and 3, a spring is connected at one end to the pin $q$ and has its other end under tension against one of the screws employed to connect an arm of the rocker with the take-up shank, it being common practice to have the rocker portion of take-up mechanism controlled by a spring. The thread is run from the tension under a spring-guide $s$ on the machine-arm, then through a self-threading opening in the upper end of the needle-bar, and then down around a skeleton guide $t$ on the face-plate M, after which said thread is looped through the latter guide onto the take-up and finally passed through the eye of the needle.

From the foregoing it will be seen that the take-up is in the arm of the machine and is not disturbed when the face-plate M is detached. It is also to be observed that various adjustments on the machine may be made without interference with said take-up.

At the needle end of the machine-head the bed-plate A is provided with a detachable leg Z, and extending at right angles from the leg is a screw-pin $u$ or other suitable support for a bell-crank A', one arm of this crank being provided with an eye loosely engaged by rod B', having an angular portion $v$, that reciprocates in an opening of corresponding diameter in the feed-bar C' to raise and lower the same on its pivot, the other end of the rod being swiveled to the shuttle-lever D' of the machine. By means of a set-screw the rod B' is adjustably secured in its swivel $w$ to regulate the rise and fall of the feed-bar, and the play of the angular portion of said rod in said feed-bar is so limited that the movement of this bar is positive in both directions on its pivot. Consequently I do away with the usual recover-spring. By having the leg Z detachable from the plate I am able to use stronger material than cast metal, and in case of breakage another leg may be readily substituted.

The shuttle-lever D' is operated from a cam

E' on the shaft C through the medium of the usual rock-lever F', hung in the arm of the machine, and a link-rod G', under control of an eccentric H' on said shaft, is employed to actuate a lever I', that connects with an arm of the bell-crank A' to effect a longitudinal reciprocation of the feed-bar, the fulcrum for said lever being adjustable longitudinally of the bed-plate A on a suitable guide, this adjustment serving to vary the leverage and regulate the feed for stitches of various lengths.

The ends of the lever I' are shown in the form of balls sprung into sockets formed in split ends of the link-rod and bell-crank above specified, binding-screws being employed to tighten these split ends of said rod and crank to prevent displacement of said balls, as well as to take up wear; but various forms of yielding joints may be utilized to connect said lever with the aforesaid rod and crank.

The fulcrum for the lever I' is a swivel J' on an angle-arm K', having loose clamp connection with a slotted guide-plate L', depending from the bed-plate of the machine. A lever M', pivoted to the bed-plate, has slot connection with a lug on the angle-arm K', and a link N' connects the lever with a nut P' on a screw Q', having a hand-wheel R', that extends up through a slot in the bed-plate. As herein shown, the screw Q' turns on the points of other screws $x$, having bearings in lugs on the under side of the bed-plate, and by the action of the former screw the fulcrum of the lever I' may be varied at the will of the operator to regulate the throw of the bell-crank. Various other means than those herein shown may be utilized to support the screw Q', this being merely a matter of expediency. A pointer $y$ on the nut P' extends through a slot in the bed-plate and operates, in connection with a scale $z$ on said bed-plate, to indicate the length of stitch, and the latter may be accurately adjusted to suit various work. It is also to be observed that the feed-bar of the machine is so hung as to give clearance for lint, and this bar has vertical slots for the engagement of binding-screws that enter the feed-dog S', whereby the latter is capable of positive adjustment on the aforesaid bar.

In addition to the leg Z above specified the bed-plate of the machine-head is provided with other legs Z', the latter being preferably cast with said plate.

Having fully described my invention, what I claim as new, and desire to secure by Letters Patent, is—

1. A sewing-machine having the arm thereof provided with a spring tension-plate having a free end, a vertical tubular branch on the arm, a head recessed at its inner end in line with the draft of the spool-thread and trunnioned in said arm branch under the free end of the tension-plate, a shank depending from this trunnioned head, an angular lever fulcrumed inside of the machine-arm and having one of its ends extended outward through a slot in said arm, and a link-rod that has free longitudinal play in a solid portion of the aforesaid arm and connects the trunnioned head-shank with the inner end of the angular lever, in combination with the feed mechanism, reciprocative needle, and the presser-foot having a lifter arranged to be swung up against the outer end of said lever.

2. A sewing-machine having the feed mechanism thereof combined with a tubular spring-controlled presser-foot shank provided with a vertical slot, a tapped sleeve loose in the presser-foot shank and provided with a lug that extends through said slot, a vibratory lever arranged to operate against the lug, and a screw-threaded vertical stem engaging the sleeve but held against other than rotary movement therein, whereby said sleeve may be vertically adjusted to regulate the position of its lug with respect to the vibratory lever.

3. A sewing-machine having the feed mechanism thereof combined with a tubular spring-controlled presser-foot shank provided with a vertical slot, a sleeve fast on the upper end of the shank and provided with a block extension engaging a guide-slot in opposition to a lifting device, a tapped sleeve loose in said shank and provided with a lug extending through the slot therein, a screw-threaded stem engaging the sleeve and provided with a rigid collar that impinges the upper end of the aforesaid shank within the sleeve thereon, a stop extending in from said sleeve above the collar, a bell-crank lever having an arm thereof opposed to the sleeve-lug, and a cam on the machine-shaft operative against the other arm of the lever.

4. A sewing-machine provided with a suitably-supported bell-crank, a shuttle-lever, a swivel on the lever, a tilting rod longitudinally adjustable in the swivel and loose in an arm of the bell-crank, a feed-bar having an opening engaged by an angular portion of the tilt-rod, and suitable means for actuating said bell-crank and shuttle-lever.

5. A sewing-machine having the under side of its bed-plate provided with a guide, an arm in loose engagement with the guide, a swivel supported by the arm, a vibratory lever loosely engaging the swivel, a lever connected to said arm, a screw rotative below the bed-plate and adjustable from above the same, a nut on the screw, and a link connecting the latter lever and nut, a bell-crank having an arm thereof connected to the former lever, and a feed-bar, having longitudinal reciprocation incidental to action of said crank.

6. A sewing-machine having the under side of its bed-plate provided with a guide, an arm in loose engagement with the guide, a swivel supported by the arm, a vibratory lever loosely engaging the swivel, a lever connected to said arm, a screw rotative below the bed-plate and adjustable from above the same, a nut on the screw, a link connecting the latter lever and nut, a pointer on the nut engaging a slot in the bed-plate, a scale adjacent to the pointer, a bell-crank having an arm thereof connected to the former lever, and a feed-bar, having longitudinal reciprocation incidental to action of said crank.

In testimony that I claim the foregoing I have hereunto set my hand, at Milwaukee, in the county of Milwaukee and State of Wisconsin, in the presence of two witnesses.

LEE A. MILLER.

Witnesses:
N. E. OLIPHANT,
HENRY DANKERT.